(12) United States Patent
Lim

(10) Patent No.: US 7,454,011 B2
(45) Date of Patent: Nov. 18, 2008

(54) ADSL COMMUNICATION SYSTEM HAVING ECHO CANCELLER AND METHOD FOR DOWNLOADING FILTER COEFFICIENT OF THE ECHO CANCELLER

(75) Inventor: Do-Hwan Lim, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 776 days.

(21) Appl. No.: 10/726,980

(22) Filed: Dec. 3, 2003

(65) Prior Publication Data

US 2004/0141471 A1    Jul. 22, 2004

(30) Foreign Application Priority Data

Dec. 20, 2002    (KR) .................... 10-2002-0081788

(51) Int. Cl.
*H04M 9/08* (2006.01)
(52) U.S. Cl. ................................. 379/406.01
(58) Field of Classification Search ............ 379/406.01
See application file for complete search history.

(56) References Cited

U.S. PATENT DOCUMENTS

| | | | | |
|---|---|---|---|---|
| 4,268,727 A | * | 5/1981 | Agrawal et al. ........ | 379/406.08 |
| 4,933,891 A | | 6/1990 | Schenk | |
| 5,621,675 A | * | 4/1997 | Linz et al. ................... | 708/313 |
| 5,841,856 A | * | 11/1998 | Ide ........................ | 379/406.08 |
| 7,167,883 B2 | * | 1/2007 | Greiss et al. ................ | 708/319 |

FOREIGN PATENT DOCUMENTS

| | | |
|---|---|---|
| EP | 0630119 | 12/1994 |
| EP | 0853390 | 7/1998 |

* cited by examiner

*Primary Examiner*—Ramnandan Singh
(74) *Attorney, Agent, or Firm*—F. Chau & Associates, LLC (57) ABSTRACT

The present invention provides an asymmetric communication system having an echo canceller and a method for downloading a filter coefficient to the echo canceller. The echo canceller is a kind of a finite impulse response (FIR) filter for calculating a correlativity between an echo input signal and an echo output signal to generate a filter coefficient. The echo canceller includes a delay line block for delaying an echo input signal for a predetermined interval to generate a delay signal, a filter coefficient table block for sequentially shifting filter coefficients which are sequentially stored in a shift register, and a multiplication and accumulation block for multiplying and adding the delay signal of the delay line block by a filter coefficient that is an output of the filter coefficient table block to generate an echo-cancelled echo output signal. The filter coefficient has the shift rate ratio between the RT mode to the CO mode of the asymmetric communication system.

9 Claims, 12 Drawing Sheets

CO Mode

Fig. 1A

CO Mode

Fig. 1B

RT Mode

Fig. 2

CO Mode:
$$y(0) = w(0) = h(0)x(0) + h(1)x(-1) + \cdots + h(7)x(-7) + h(254)x(-254) + h(255)x(-255)$$
$$y(1) = w(4) = h(0)x(4) + h(1)x(3) + \cdots + h(7)x(-3) + h(254)x(-250) + h(255)x(-251)$$
$$y(2) = w(8) = h(0)x(8) + h(1)x(7) + \cdots + h(254)x(-246) + h(255)x(-247)$$
$$y(3) = w(12) = h(0)x(12) + h(1)x(11) + \cdots + h(254)x(-242) + h(255)x(-243)$$

$$y(n) = w(4n) = h(0)x(4n) + h(1)x(4n-1) + \cdots + h(7)x(4n-7) + \cdots + h(254)x(4n-254) + h(255)x(4n-255)$$
$$y(n+1) = w(4n+4) = h(0)x(4n+4) + h(1)x(4n+3) + \cdots + h(7)x(4n-3) + \cdots + h(254)x(4n-250) + h(255)x(4n-251)$$
$$y(n+2) = w(4n+8) = h(0)x(4n+8) + h(1)x(4n+7) + \cdots + h(7)x(4n+1) + \cdots + h(254)x(4n-246) + h(255)x(4n-247)$$
$$y(n+3) = w(4n+12) = h(0)x(4n+12) + h(1)x(4n+11) + \cdots + h(7)x(4n+5) + \cdots + h(254)x(4n-242) + h(255)x(4n-243)$$

RT Mode:
$$y(0) = h(0)x(0) + h(4)x(-1) + h(8)x(-2) + \cdots + h(248)x(-62) + h(252)x(-63)$$
$$y(1) = h(1)x(0) + h(5)x(-1) + h(9)x(-2) + \cdots + h(249)x(-62) + h(253)x(-63)$$
$$y(2) = h(2)x(0) + h(6)x(-1) + h(10)x(-2) + \cdots + h(250)x(-62) + h(254)x(-63)$$
$$y(3) = h(3)x(0) + h(7)x(-1) + h(11)x(-2) + \cdots + h(251)x(-62) + h(255)x(-63)$$
$$y(4) = h(0)x(1) + h(4)x(0) + h(8)x(-1) + \cdots + h(248)x(-61) + h(252)x(-62)$$
$$y(5) = h(1)x(1) + h(5)x(0) + h(9)x(-1) + \cdots + h(249)x(-61) + h(253)x(-62)$$

$$y(16n) = h(0)x(4n) + h(4)x(4n-1) + h(8)x(4n-2) + \cdots + h(248)x(4n-62) + h(252)x(4n-63)$$
$$y(16n+1) = h(1)x(4n) + h(5)x(4n-1) + h(9)x(4n-2) + \cdots + h(249)x(4n-62) + h(253)x(4n-63)$$
$$y(16n+2) = h(2)x(4n) + h(6)x(4n-1) + h(10)x(4n-2) + \cdots + h(250)x(4n-62) + h(254)x(4n-63)$$
$$y(16n+3) = h(3)x(4n) + h(7)x(4n-1) + h(11)x(4n-2) + \cdots + h(251)x(4n-62) + h(255)x(4n-63)$$
$$y(16n+4) = h(0)x(4n+1) + h(4)x(4n) + h(8)x(4n-1) + \cdots + h(248)x(4n-61) + h(252)x(4n-62)$$
$$y(16n+5) = h(1)x(4n+1) + h(5)x(4n) + h(9)x(4n-1) + \cdots + h(249)x(4n-61) + h(253)x(4n-62)$$

RT Mode

Fig. 5A

CO Mode

Fig. 5B

RT Mode

- DSP Operation -

Fig. 7B

- EC H/W Operation -

Fig. 8A

CO Mode

Fig. 8B

RT Mode

ADSL COMMUNICATION SYSTEM HAVING ECHO CANCELLER AND METHOD FOR DOWNLOADING FILTER COEFFICIENT OF THE ECHO CANCELLER

FIELD OF THE INVENTION

The present invention relates to an asymmetric communication system and, more particularly, to an echo canceller hardware structure and a method for downloading a filter coefficient of the echo canceller.

BACKGROUND OF THE INVENTION

In order to make high data rate interactive services such as video and internet access available to more residential and small business customers, high-speed data communications paths are required. Although fiber optic cable is the preferred transition media for such high data rate services, it is not readily available in existing communication networks and the expense of installing fiber optic cabling is prohibitive. Current telephone wiring connections, which consist of copper twisted-pair media, were not originally designed to support the data rates or bandwidth required for interactive services such as video on demand or even high speed internet connections. Asymmetric digital subscriber line (hereinafter referred to as "ADSL") technology has been developed to increase the effective bandwidth of existing twisted-pair connections, allowing interactive services to be provided without requiring the installation of fiber optic cable. An ADSL modem can directly convert a stream of digital data into a large number of separate analog channels, operating at different frequencies and data rates to take advantage of all the available bandwidth of the telephone line. This discrete Multi-tone technology is designed to adapt to changes in the telephone line, due to temperature, or interference due to other calls and lines. To create multiple channels, ASL modems divide the available band-width of a telephone line.

By reusing the existing phone line, ADSL technology leads to further popularization of the Internet communication network. According to the ADSL standard G.DMT, approved by the International Telecommunications Union (ITU), a transfer channel is divided into many channels and data is transferred based on the state of the respective channels to widen a transfer bandwidth, with maximum data rates of 8 Mbps downstream to the subscriber and 1.5 Mbps upstream from the subscriber. G.Lite—Officially known as G.992.2, it is now a standard way to install ADSL service. G.Lite makes it possible to have Internet connections to home and business computers at up to 1.5 Mbps over regular phone lines. Using an extension to the ADSL standard, known as S=½, on 24-gauge wire, ADSL is capable of driving 10 mbps to nearly 10,000 feet. Thus, a very high-speed communication network may be implemented with ADSL technology. In an interactive ADSL communication system, a signal transmitted to the reception side along a loop line causes an echo. Since the echo results in a communication barrier, various efforts to cancel the echo have been made. A conventional echo canceller analyzes and predicts an echo generated when a loop is made, and cancels the echo at a received signal.

Conventional methods for canceling an echo are disclosed in U.S. Pat. No. 5,909,436, Japanese Patent Laid-Open Application No. 2000-049885, and Korea Patent Application No. 2001-09502. According to U.S. Pat. No. 5,909,436, a control register is disposed between a receive data buffer and a transfer data buffer. The two buffers have different sizes because of a difference between a data rate at a transfer side and a data rate at a reception side in a central office (CO) mode and a remote terminal (RT) mode. The control register is switched through software. However, since a filter coefficient is stored in a memory, a memory address control logic is needed.

According to the Japanese Patent Laid-Open Application No. 2000-049885, only a high SNR (signal-to-noise ratio) channel is selectively used and the other channels are mask-processed to lower a data rate. However, this patent supports a low sampling rate and thus cannot be practically applied to the current internet infrastructure.

According to the Korea Patent Application No. 2001-09502, an echo canceller includes a lattice-type filter unit which is used to remove the correlativity with respect to an input signal. An impulse response is presumed in an infinite impulse response (IIR) filter to shorten convergence time. Dozens of taps constitute one hardware. The echo canceller can have a high efficiency with respect to a voice signal having a high correlativity between signals, but is not suitable for current ADSL systems which must cancel the echo of 70-80 dB.

A conventional echo canceller (EC) circuit may use 512 FIFOs for the input data of 2.2M samples/s in the CO mode, and use 128 FIFOs for the input data of 552K samples/s in the RT mode.

Accordingly, there is a need for an echo canceller which is suitable to an ADSL communication system and shares the hardware in CO and RT modes to simplify its hardware structure.

SUMMARY OF THE INVENTION

A feature of the present invention is to provide an echo canceller which shares the hardware in central office (CO) and remote terminal (RT) modes of an ADSL system.

Another feature of the present invention is to provide a method for downloading a filter coefficient of the echo canceller.

According to an aspect of the present invention, an asymmetric communication system with an echo canceller is provided. The echo canceller includes a delay line block for delaying an echo input signal for a predetermined interval to generate a delay signal, a filter coefficient table block for sequentially shifting filter coefficients that are sequentially stored in a shift register, and for outputting a filter coefficient ; and a multiplication and accumulation block for multiplying and adding the delay signal of the delay line block by the filter coefficient that is an output by the filter coefficient table block to generate an echo-cancelled echo output signal.

Preferably, the echo canceller is a finite impulse response (FIR) filter which calculates the correlativity between the echo input signal and an echo output signal to generate the filter coefficient. The shift register is shared by hardware used for a CO mode and an RT mode of the asymmetric communication system. The filter coefficient has a shift rate of 1:4 that is a rate of the RT mode to the CO mode. The delay line block divides a line for inputting an echo input signal into eight delay lines to delay the echo input signal.

According to another aspect of the present invention, an asymmetric communication system with an echo canceller is provided. The echo canceller includes an input interface block for receiving echo input data of a first rate in a first (CO) mode and echo input data of a second rate in an second (RT) mode, a sub FIFO block for shifting the echo input data of the first rate in the first mode by downsampling and shifting the echo input data of the second rate in the second mode by upsampling, a main FIFO block for shifting the echo input data of the second rate in the first mode and shifting the echo input data of the first rate in the second mode, a multiplexer for selectively connecting the sub FIFO block to the main FIFO block in accordance with the first and second modes, and an input interface block for generating an echo output signal of the second rate in the first mode and generating an echo output signal of the first rate in the second mode. In the first mode, the input interface block, the sub FIFO block, the main FIFO block, and the output interface block are sequentially connected. In the second mode, the input interface block, the main FIFO block, the sub FIFO block, and the output interface block are sequentially connected.

Preferably, the echo canceller further includes a multiplication and accumulation block for multiplying and adding the filter coefficient stored in the sub FIFO block in the CO mode by the filter coefficient stored in the main FIFO block. The main FIFO block mainly delays the echo input signal by means of a 128-depth FIFO, and the sub FIFO block finely delays the echo input signal by means of a four-depth FIFO. The echo canceller operates relative to an echo-dominant channel among channels of the asymmetric communication system. The echo canceller receives the delay of the echo-dominant channel from a digital signal processor (DSP).

According to still another aspect of the present invention, a method for downloading a filter coefficient of an echo canceller in an asymmetric communication system is provided. The method includes the first to sixth steps. The first step is to perform an echo cancel training for a newly generated loop during an initial period to determine a filter coefficient. The second step is to compare a write register value with a read register value (in response to a first value of a download register) and to write the filter coefficient into a data register and to toggle the write register value when the write register value and the read register value are identical to each other. The third step is to repeatedly perform the first and steps while a "coefficient download" index increases. The fourth step is to check whether the read register value and the write register value are different from each other, (in response to a second value of the download register), and to allocate the coefficient stored in the data register to the shift register in the echo canceller when the read and write register values are equal to each other. The fifth step is to sequentially shift the shift register to toggle the read register value when an index is the last value. The sixth step is to finish the operation of the echo canceller (when the download register is the first value).

BRIEF DESCRIPTION OF THE DRAWINGS

FIG. 2 illustrates mathematically an example of the operation of an echo canceller (EC) circuit.

DESCRIPTION OF THE PREFERRED EMBODIMENTS

An ADSL communication system according to the present invention will now be described more fully with reference to attached drawings.

In the ADSL communication system, a telephone office and a subscriber are interconnected through a phone line.

Figure 1A:
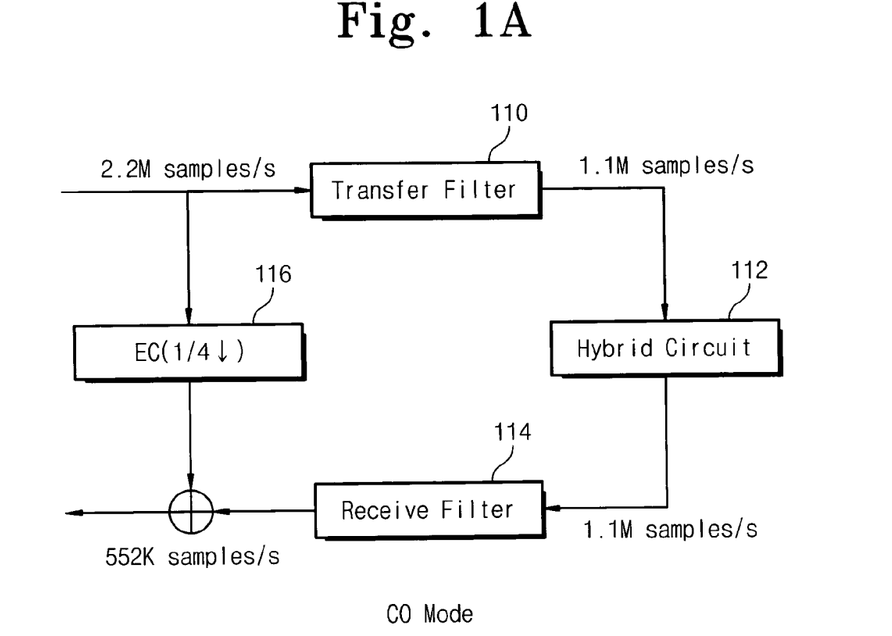
FIG. 1A and FIG. 1B show data transfer rates in a central office (CO) mode and a remote terminal (RT) mode, respectively.
Figure 1B:
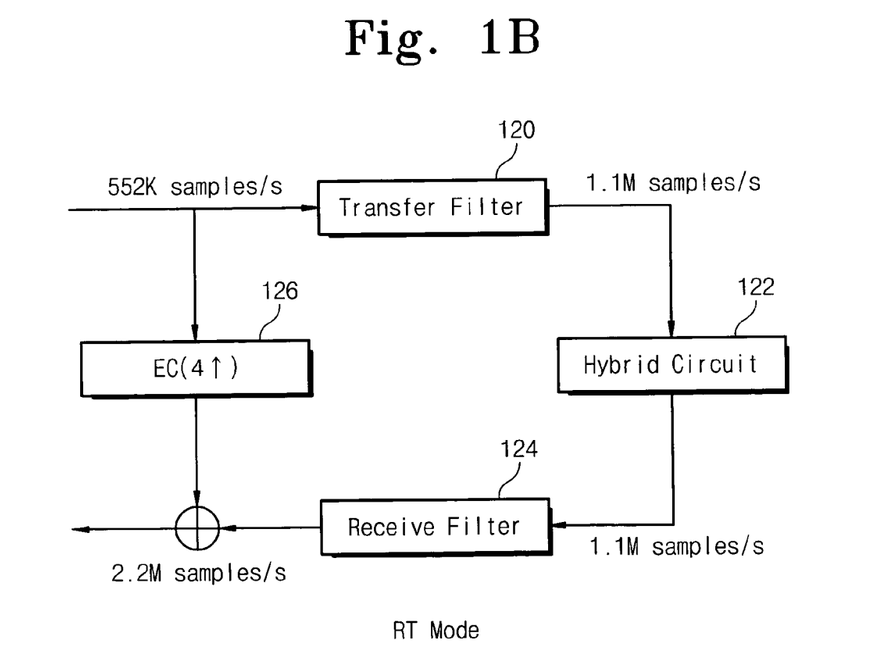

Data transfer rates in a central office (CO) mode and a remote terminal (RT) mode are illustrated in FIG. 1A and FIG. 1B, respectively. In the CO mode shown in FIG. 1A, high rate data of 2.2M samples/s is inputted to a transfer filter 110, and output data of 1.1M samples/s data of the transfer filter 110 is inputted to a receive filter 114 through a hybrid circuit 112. The hybrid circuit 112 is an analog circuit and a line interface that serves as the interface to the two-wire copper telephone line and is coupled to a phone line (not shown) coupled to an remote terminal (RT). The Hybrid circuit 112 is basically a high power differential amplifier in the Tx direction and a passive network in the Rx direction. The data of 1.1M samples/s inputted to the receive filter 114 is outputted as low rate data of 552K samples/s. The echo canceller (EC) circuit 116 should receive high rate data of 2.2M samples/s to cancel an echo with the use of low rate data of 552K samples/s (the data rate ratio being 1/4). Hence, the echo canceller (EC) circuit 116 performs a quarter downsampling operation, i.e., decimation (filter) operation.

In the RT mode shown in FIG. 1B, low rate data of 552K samples/s is inputted to a transfer filter 120, and output data of 1.1M samples/s of the transfer filter 120 is inputted to a receive filter 124 through a hybrid circuit 122. The hybrid circuit 122 is coupled to a phone line (not shown) coupled to a central office (CO). Data of 1.1M samples/s inputted to the receive filter 124 is outputted at a high rate of 2.2M samples/s. The echo canceller circuit (EC) circuit 126 receives a low rate data of 552K samples/s to cancel high rate data of 2.2M samples/s (the data rate ratio being 4/1). Hence, the echo canceller (EC) circuit 126 must perform a four times upsampling operation, i.e., interpolation (filter) operation.

The echo canceller (EC) circuits 116 and 126 of FIG. 1A and FIG. 1B respectively may each be implemented as a finite impulse response (hereinafter referred to as "FIR") filter. Each FIR filter includes delay elements or delay shift registers which are serially interconnected for delaying an input signal for a predetermined interval. The FIR filter has a correlator which calculates the correlativity between an input signal and an echo output signal of the hybrid circuit 112 or 122 to provide a tap-weight coefficient. In order to cancel an echo, a number of taps is needed equal to the number of impulse responses of an echo path. In case that the filter coefficient is downloaded to a memory, a decoder and an encoder are needed for controlling an address of the memory.

FIG. 2 illustrates mathematically an example of the operation of the inventive echo canceller (EC) circuit (116 and/or 126). The echo canceller (EC) operation is first described in a CO mode. For each y(n), eight multiplications, i.e., $h(0) \times (4n)$, $h(1) \times (4n-1)$, . . . , and $h(7) \times (4n-7)$ are sequentially performed. In RT mode, four outputs y(16n), y(16n+1), y(16n+2), and y(16n+3) are multiplied with $h(0) \times (4n)$, $h(1) \times (4n)$, $h(2) \times (4n)$, $h(3) \times (4n)$, $h(4) \times (4n-1)$, $h(5) \times (4n-1)$, $h(6) \times$ (4n−1), and h(7)×(4n−1). In the CO and RT modes, a coefficient corresponding to data input pair value (×(4n) and ×(4n−1)) is drawn out to commonly use a coefficient input in the RT mode as well as the CO mode. And the coefficient input of the RT mode to the CO mode has a shift rate difference of 1:4 approximately.

Figure 3:
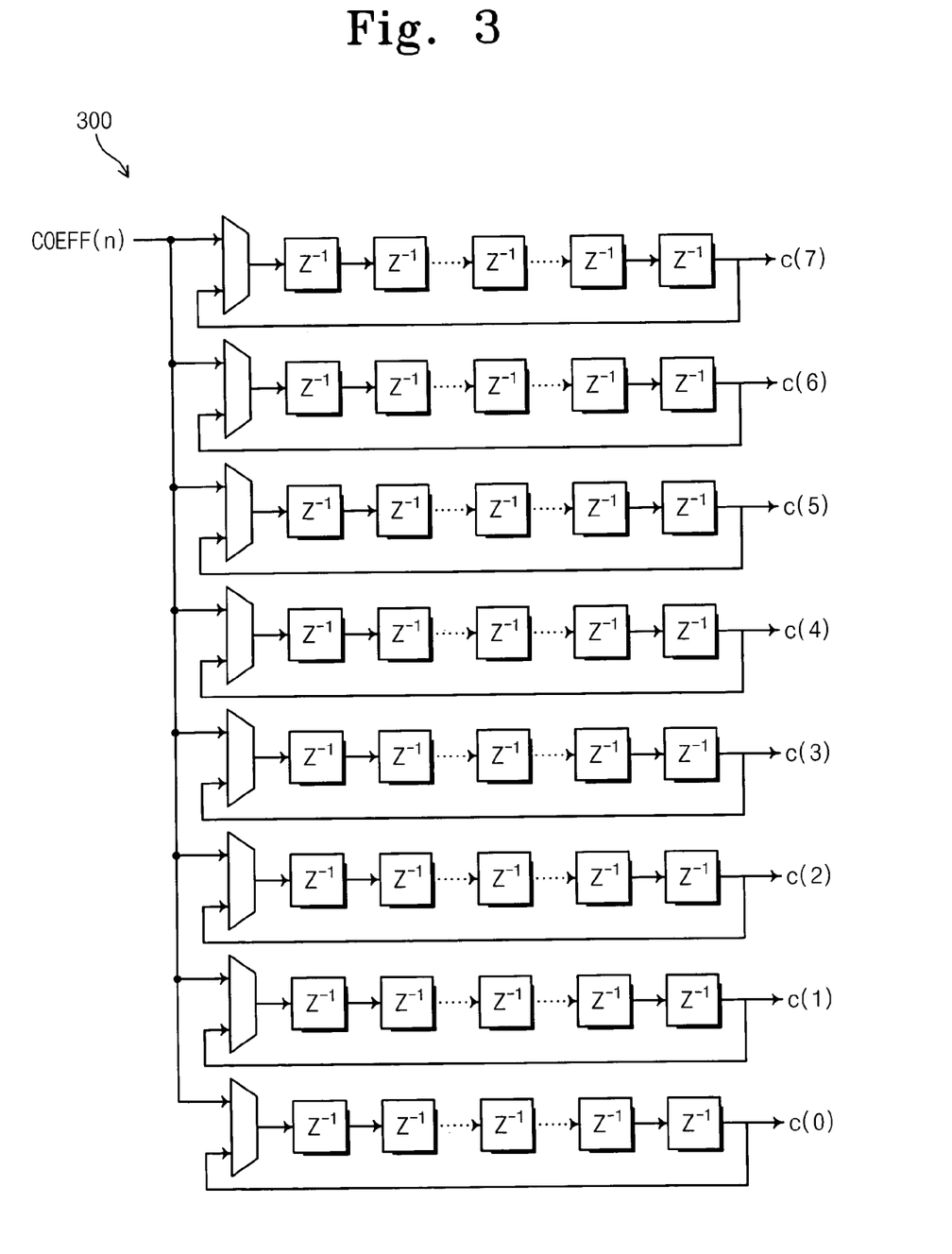
FIG. 3 shows a shift register in which filter coefficients of the inventive echo canceller (EC) circuit are stored.

FIG. 3, shows the structure of a shift register 300 that receives sequentially inputted filter coefficients. After the inputted filter coefficients are sequentially inputted to a shift register which is structured as shown in FIG. 3, they are sequentially outputted. Here, $Z^{-1}$ represents the unit of delay caused by a shift register. To rearrange the coefficient outputted from the shift register 300 in accordance with the requirements of CO and RT modes, the hardware structure for a delay line is provided as shown in FIGS. 4A, 4B, 4C and FIGS. 5A and 5B.

Figure 4A:
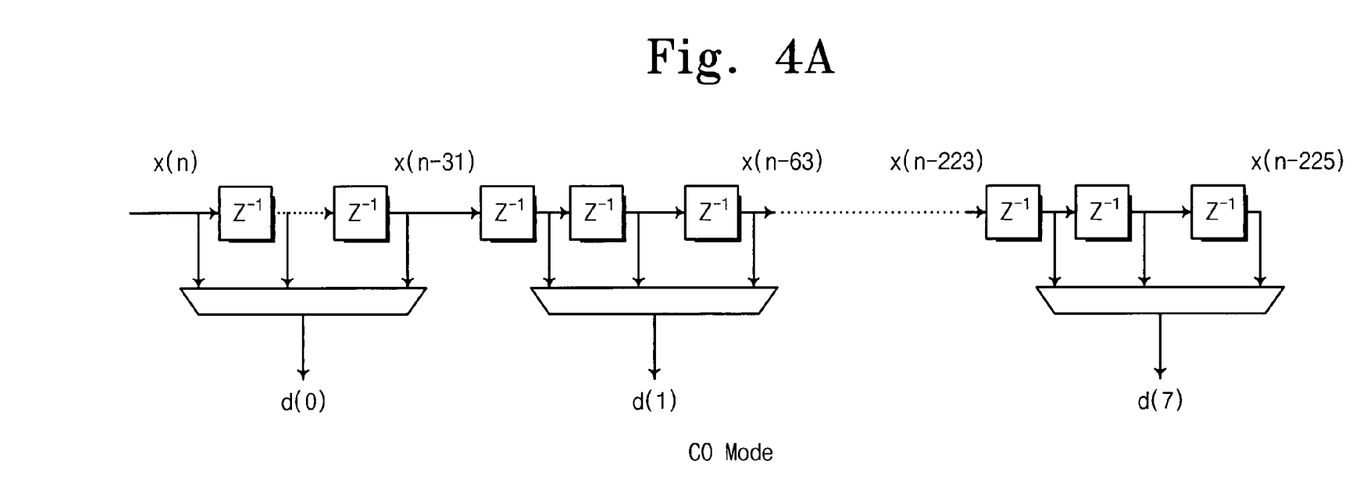
FIG. 4A shows a 1:4 shift register using eight 3:1 multiplexers.

FIG. 4A shows a 1:4 shift register using eight 3:1 multiplexers of 16 bits in the CO mode.

Figure 4B:
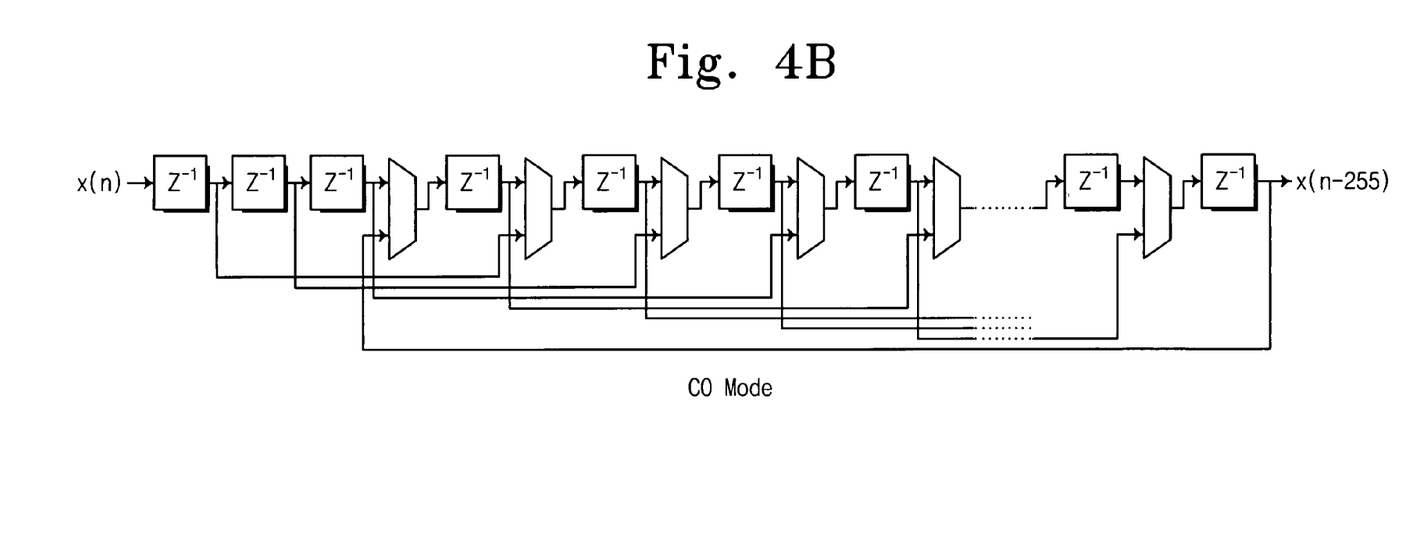
FIG. 4B shows a 1:4 shift register using 256 2:1 multiplexers.

FIG. 4B shows a 1:4 shift register using 256 2:1 multiplexers of 16 bits in the CO mode.

Figure 4C:
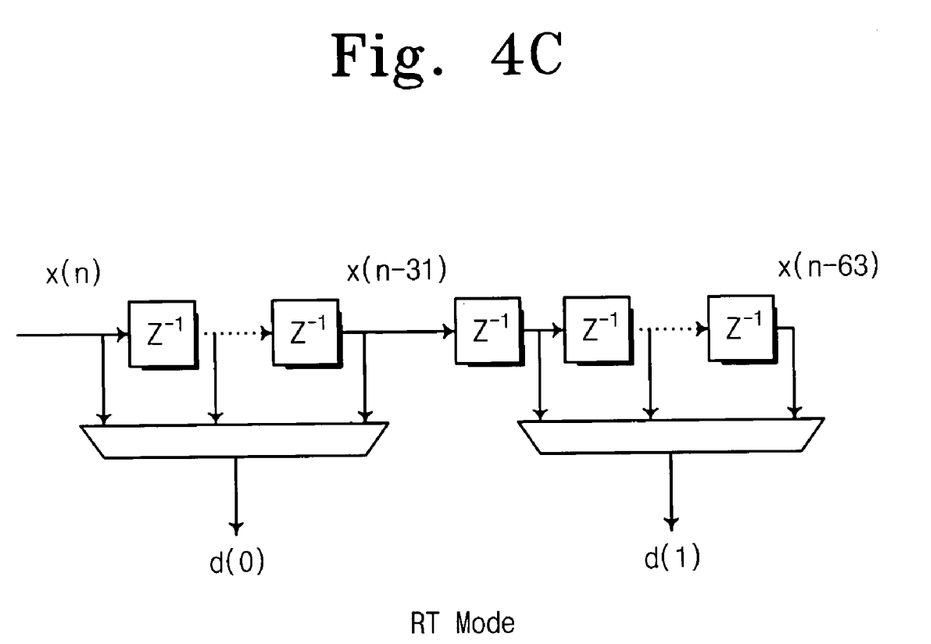
FIG. 4C shows a 1:4 shift register using two 32:1 multiplexers.

FIG. 4C shows a 1:4 shift register using two 32:1 multiplexers of 16 bits in the RT mode. Using one delay line, a filter coefficient stored in a shift register is simply shifted to be provided to an input of a multiplexer. In order to achieve this, eight 32:1 multiplexers of 16 bits or 256 2:1 multiplexers of 16 bits are needed, which leads to the complexity of a hardware structure. On the other hand, if the same hardware is shared in common between the CO and RT modes, the hardware structure of an echo canceller (EC) circuit is more simplified.

Figure 5A:
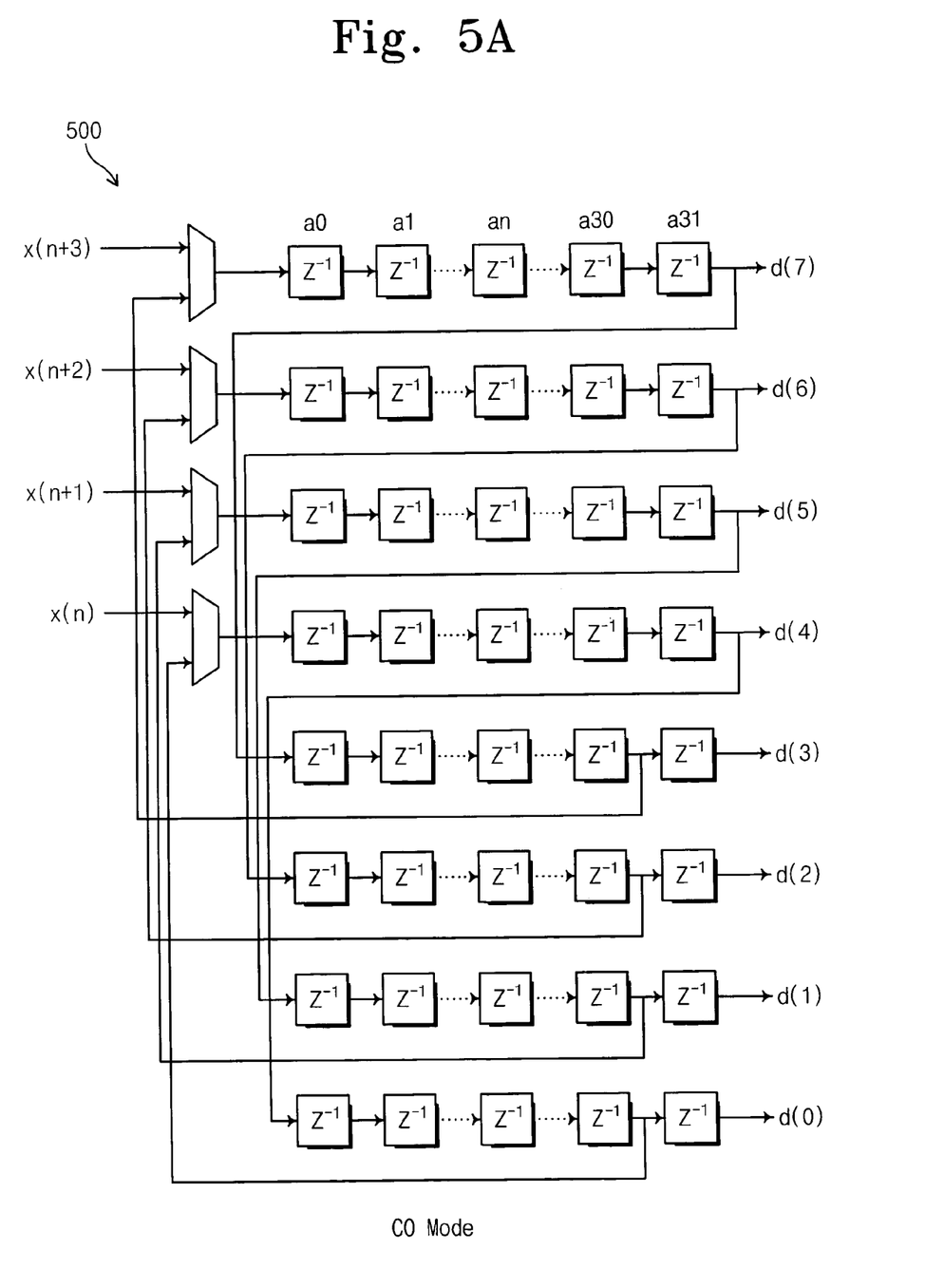
FIG. 5A and FIG. 5B show the hardware structure of a delay line in CO and RT modes, respectively, which implement a 1:4 shift register, in accordance with an embodiment of the present invention.
Figure 5B:
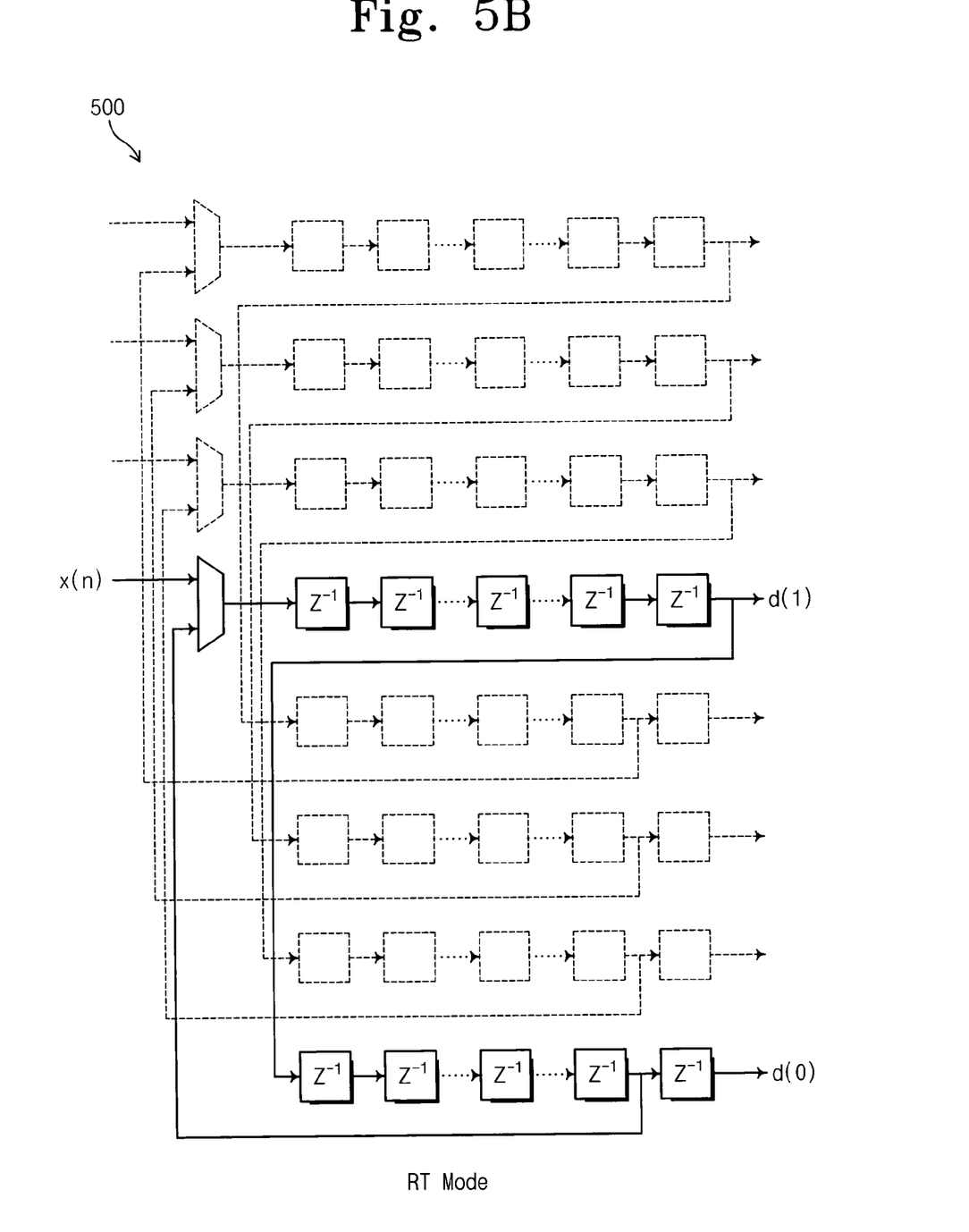

FIG. 5A and FIG. 5B show hardware structures of a delay line for CO and RT modes respectively, which implement a 1:4 shift register according to an embodiment of the present invention. Referring to FIG. 5A, if a delay line is divided into eight lines, four 2:1 multiplexers of 16 bits are needed. FIG. 5B shows the example that the RT mode is implemented by partially using the hardware structure 500 for the CO mode.

Figure 6:
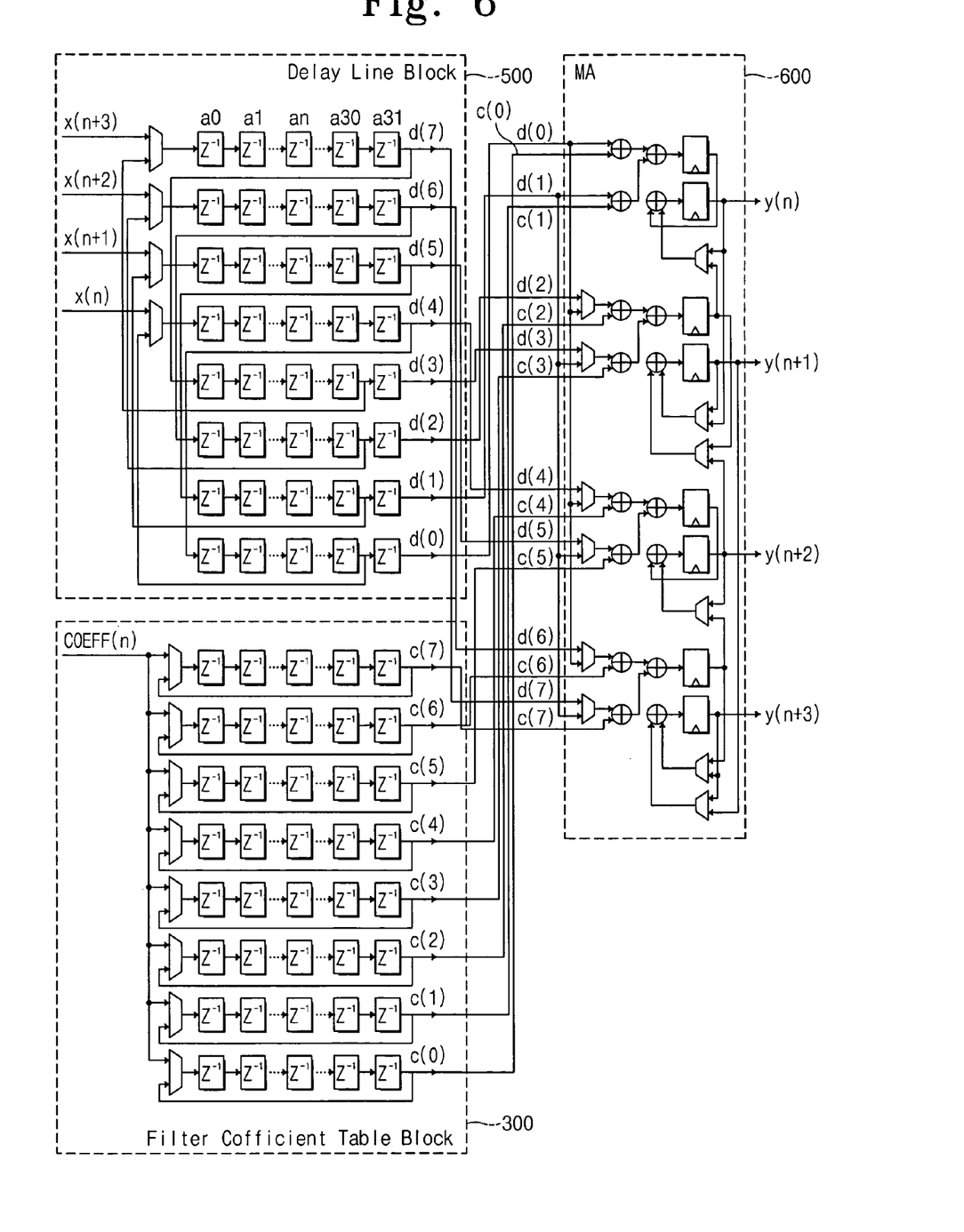
FIG. 6 shows the hardware structure of an echo canceller including the delay line of FIG. 5A and FIG. 5B.

FIG. 6 shows a hardware structure of an echo canceller (EC) circuit constructed according to an embodiment of the present invention. The echo canceller (EC) circuit of FIG. 6 is a finite impulse response (FIR) filter that calculates correlativity between echo input signals x(n+3), x(n+2), x(n+1), and x(n) and echo output signals y(n), y(n+1), y(n+2), and y(n+3) to generate filter coefficients COEEF(n). The echo canceller (EC) circuit includes a delay line block 500, a filter coefficient table block 300, and a multiplication & accumulation block (MA) 600. The delay line block 500 divides a line for inputting an echo input signal into eight delay lines to delay echo input signals x(n+3), x(n+2), x(n+1), and x(n) for a predetermined interval and thus generates a delay signal (d(0) through d(7)). The filter coefficient table block 300 sequentially shifts the filter coefficients which are sequentially stored in the shift register that is used in the CO and RT modes. The filter coefficient has a shift rate of 1:4 that is a ratio of the RT mode to the CO mode in an asymmetric communication system. The MA 600 multiplies and adds the delay signal and of the delay line block 500 by a filter coefficient (c(0) through c(7)) that is an output of the filter coefficient table block 300 to generate echo-cancelled echo output signals y(n), y(n+1), y(n+2), and y(n+3).

Figure 7A:
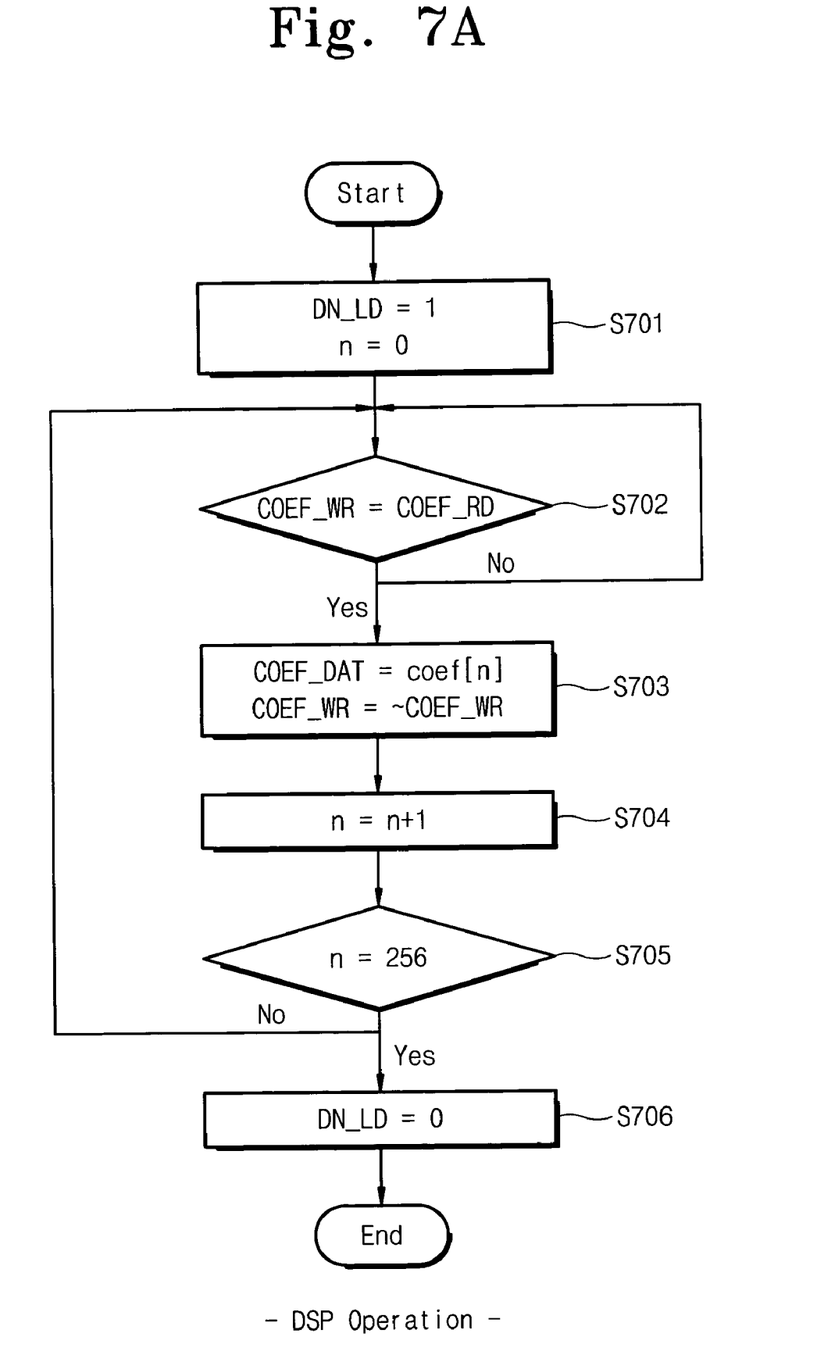
FIG. 7A and FIG. 7B depict a method for downloading a filter coefficient in accordance with an embodiment of the present invention.
Figure 7B:
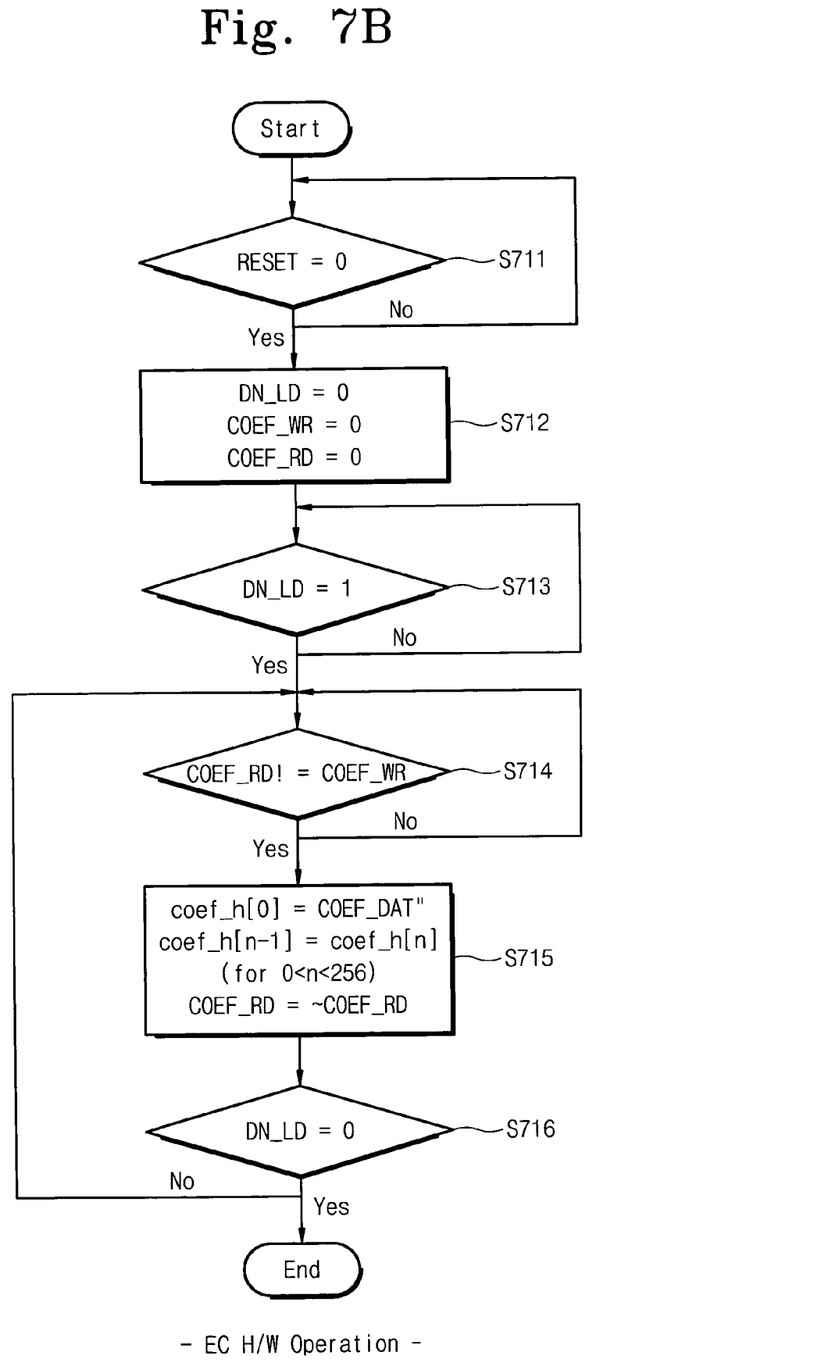

FIG. 7A and FIG. 7B depict a method for downloading a filter coefficient stored in a shift register. A filter coefficient is stored in a data register COFF_DAT which is a kind of a shift register. A download register DN_LD is a register for informing hardware that a filter coefficient has been completely downloaded (DN_LD=0) or has not been completely downloaded (DN_LD=1). A write register COFF_WR is a register for informing the hardware that a digital signal processor (DSP) has written the filter coefficient. A read register COFF_RD is a register for informing the DSP that the hardware has read out the filter coefficient.

FIG. 7A shows the operation of the digital signal processor (DSP). When echo canceller (EC) training (e.g., calibration) is completed for a loop newly generated during an initial period, the DSP sets the download register DN_LD to "1" to inform hardware that a coefficient download starts and clears an index (n) to "0" (step S701). Thereafter, a write register COFF_WR value and a read register COFF_RD value are compared with each other. If they are identical to each other, the routine proceeds to step S703. If they are different from each other, step S702 are repeated. In step S703, a coefficient is written into the data register COFF_DAT of a corresponding index and the write register COFF_WR is toggled. In step S704, the index (n) increments by 1. In step S705, "coefficient download" index (n) is compared to its maximum index (terminal) value (e.g., 256). If index (n) equals the maximum index value (e.g., 256), the routine proceeds to step S706 in which the download register DN_LD is cleared to "0" to inform the hardware that the download has been completed. If index (n) is not equal to the maximum index value (e.g., 256), the routine returns to step S702.

FIG. 7B shows the operation of the echo canceller (EC) hardware according to an embodiment of the invention. When a reset signal RESET is set to "0" (step S711), the download register DN_LD, the write register COFF_WR, and the read register COFF_RD are cleared to "0" (step S712). Thereafter, the value of the download register DN_LD controlled from the DSP is compared with "1". If DN_LD equals "1", the routine proceeds to step S714. If the download is not complete (e.g., DN_LD=0), the routine waits until the value of the download register DN_LD reaches "1". In step S714, the read register COFF_RD value and the write register COFF_WR value are compared with each other. If they are identical to each other, the routine proceeds to step S715. If they are different from each other, the routine waits until they become identical to each other. This step is to check whether a coefficient has been written into the data register COFF_DAT of a corresponding index and the write register COFF_WR is toggled (step S703 of FIG. 7A). In step S715, the coefficients stored in the data register COFF_DATA are allocated to a first shift register coef_h[0] in the echo canceller (EC) hardware. If an index becomes 256 by sequentially shifting these coefficients (coef_h[0]+coef_h[n], for 0<n<256) to make an index become 256, the read register COEF_RD value is togged. In step S716 the download register DN_LD value is compared with "0". If the value of the download register DN_LD equals "0", the echo canceller (EC) hardware operation is completed. If the value of the download register DN_LD is not "0", the routine returns to step S714.

The echo may occur in the entire channel in the ADSL system. If the echo is cancelled for the most dominant channels, the hardware scale may be considerably downsized. This advantage is achieved by an echo canceller (EC) circuit according to another embodiment of the present invention. The echo canceller (EC) circuit according to the illustrative embodiment of the invention is described with reference to FIG. 8A and FIG. 8B.

Returning to FIG. 1A and FIG. 1B, in the CO mode, data of 2.2M samples/s is outputted as data of 552K samples/s through the transfer filter 110, the hybrid circuit 112, and the receive filter 114. In the RT mode, the data 552K samples/s is outputted as data of 2.2M samples/s through the transfer filter 120, the hybrid circuit 122, and the receive filter 124. Conventional echo canceller (EC) circuit use 512 FIFOs for the input data of 2.2M samples/s in the CO mode, and 128 FIFOs are used for the input data of 552K samples/s in the RT mode. The inventive echo canceller (EC) circuit uses a 128-depth main FIFO block and a 4-depth sub FIFO block instead of a conventional 512-depth FIFO.

Figure 8A:
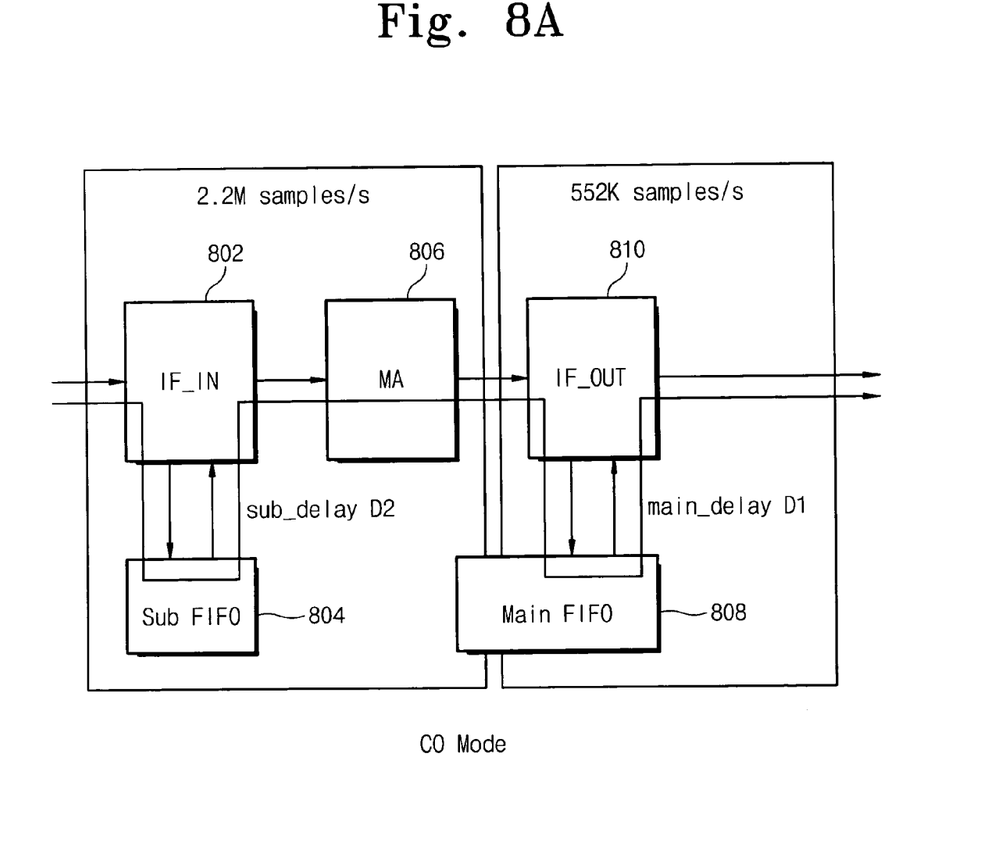
FIG. 8A and FIG. 8B show the hardware structure of an echo canceller in accordance with another embodiment of the present invention.

In CO mode as shown in FIG. 8A, after inputting data of 2.2M samples/s to an input interface block (IF_IN) 802, data of 552K samples/s are sequentially outputted through a sub FIFO block 804, a multiplication & accumulation block (MA) 806, a main FIFO block 808, and an output interface block (IF_OUT) 810. The sub FIFO block 804 performs a quarter downsampling operation to turn the input data of 2.2M samples/s into data of 552K samples/s. Thereafter, the sub FIFO block 804 finely delays the data of 552K samples/s by means of a four-depth FIFO. The main FIFO block 808 delays the inputted data of 552K samples/s by means of a 128-depth FIFO.

Figure 8B:
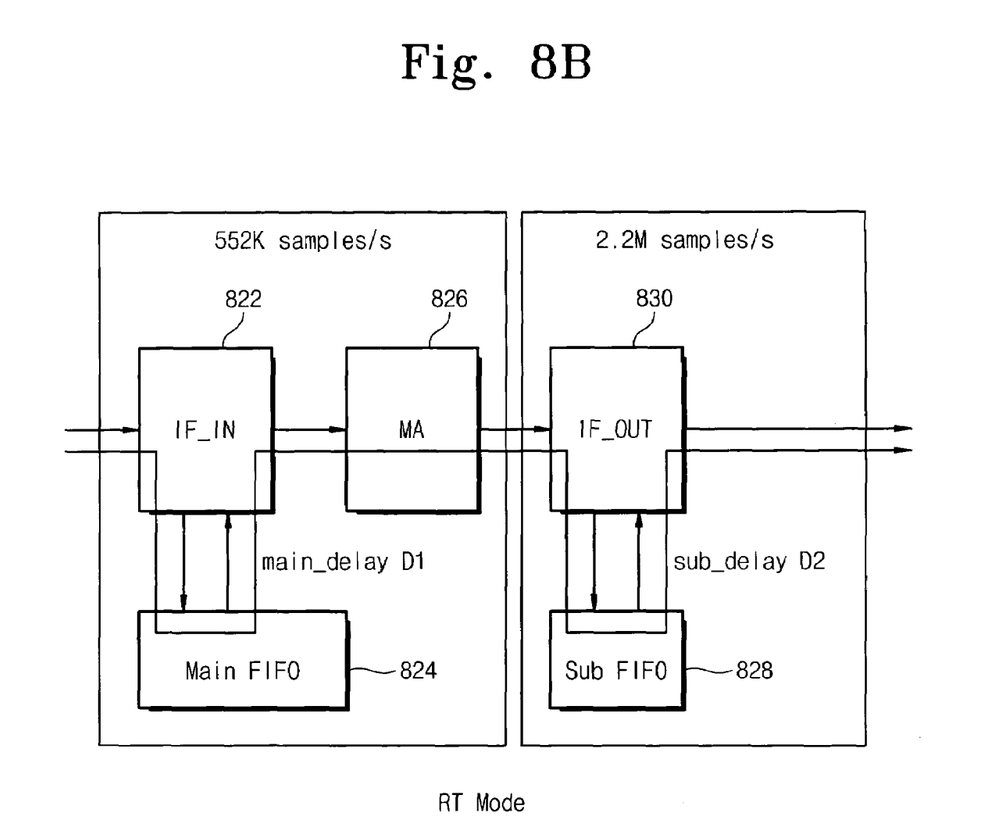

In RT mode as shown in FIG. 8B, after inputting data of 552K samples/s to an input interface block (IF_IN) 822, data of 2.2M samples/s are sequentially outputted through a main FIFO block 824, a multiplication & accumulation block (MA) 826, a sub FIFO block 828, and an output interface block (IF_OUT) 830. The sub FIFO block 826 performs a four time upsampling operation to turn the mainly delayed data of 552K samples/s into data of 2.2M samples/s. Thereafter, the sub FIFO block 826 finely delays the data of 2.2M samples/s.

In CO mode as shown in FIG. 8A and in RT mode as shown in FIG. 8B, each delay time Tdelay is given as follows:

$$T\text{delay} = D1 \times 4 + D2$$

wherein the D1 represents the time delayed by the main FIFO blocks 808 and 804 and the D2 represents the time delayed by the sub FIFO blocks 804 and 826.

Since the data rate of the main FIFO blocks 808 and 824 becomes identical to that of the sub FIFO blocks 804 and 826 through four time interpolation (filter) operations, main delay time is multiplied by 4.

In this embodiment, the echo canceller (EC) circuit uses the main FIFO blocks 808 and 824 and the sub FIFO blocks 804 and 826 in both the CO and RT modes respectively. But the main FIFO block is used in a low data rate mode and the sub FIFO block is used in a high data rate mode. The conventional echo canceller (EC) circuit uses a 128-depth main FIFO block and a 4-depth sub FIFO block instead of a conventional 512-depth FIFO used in a conventional echo canceller (EC) circuit.

According to one or more embodiments of the present invention, an interpolation filter and a decimation filter are maximally shared, in an echo canceller (EC) circuit's operation, between a CO mode and an RT mode of an ADSL system. A DSP adds a controllable delay function to perform an echo-canceling operation only for the most dominant channel, not an entire channel. Thus, a hardware structure of the echo canceller is simplified.

Having above indicated preferred embodiments of the present invention, it will occur to a person skilled in the art that modifications and alternatives may be made within the spirit of the invention. Accordingly, the scope of the invention is defined only as indicated in the following claims.

What is claimed is:

1. An echo canceller, for an asymmetric communication system configured to download an input signal at a first data rate and to upload an output signal at a second data rate different from the first data rate, comprising:
   a delay line block for delaying the input signal for a predetermined interval to generate a delay signal;
   a filter coefficient table block for sequentially shifting filter coefficients stored in a shift register, and for sequentially outputting a filter coefficient; and
   a multiplication and accumulation block for multiplying and adding the delay signal of the delay line block by the filter coefficient output by the filter coefficient table block to generate an echo-cancelled output signal.

2. The echo canceller of claim 1, wherein the echo canceller is a finite impulse response (FIR) filter that calculates the correlativity between the input signal and an echo output signal to generate the filter coefficients.

3. The echo canceller of claim 1, wherein the shift register is used while the echo canceller operates in the central office (CO) mode and while the echo canceller operates in the remote terminal (RT) mode.

4. The echo canceller of claim 1, wherein the filter coefficient output by the filter coefficient table block has a shift rate equal to the ratio of the first data rate and the second data rate.

5. The echo canceller of claim 4, wherein the ratio of the first data rate and the second data rate equals 1:4.

6. The echo canceller of claim 1, wherein while operating in the central terminal (CO) mode the delay line block divides a line for inputting the input signal into eight delay lines to delay the input signal.

7. The echo canceller of claim 1, wherein the delay line block includes a plurality m of delay lines used in central office (CO) mode for delaying the input signal for a predetermined interval to generate the delay signal, wherein fewer than m among the m delay lines are used for delaying the input signal while the echo canceller operates in a remote terminal (RT) mode, wherein while the echo canceller operates in the central office (CO) mode the second data rate is greater than the first data rate.

8. The echo canceller of claim 1, wherein while operating in the central terminal (CO) mode the delay line block divides a line for inputting the input signal into eight delay lines to delay the input signal.

9. An echo canceller for an asymmetric communication system configured to download data and to upload data at different data rates, comprising:
   a delay line block, for delaying a digital input signal received at a first data rate for a predetermined interval to generate a delay signal, having a plurality m of delay lines, wherein m is an integer number and fewer than m among the m delay lines are used for delaying the input signal while the echo canceller operates in a remote terminal (RT) mode,
   a filter coefficient table block for sequentially shifting filter coefficients stored in a shift register, and for sequentially outputting a filter coefficient; and
   a multiplication and accumulation block for multiplying and adding the delay signal of the delay line block by the filter coefficient output by the filter coefficient table block to generate an echo-cancelling signal to an adder for outputting an echo-cancelled digital output signal at a second data rate different from the first data rate.

* * * * *